Oct. 5, 1954   E. J. OTTO   2,690,677
SHEAVE LUBRICATING SYSTEM
Original Filed March 29, 1951   2 Sheets-Sheet 1

Inventor
Eugene J. Otto
by Wayne D. Easton
Attorney

Oct. 5, 1954  E. J. OTTO  2,690,677

SHEAVE LUBRICATING SYSTEM

Original Filed March 29, 1951  2 Sheets-Sheet 2

Inventor
Eugene J. Otto
by Wayne B. Easton
Attorneys

Patented Oct. 5, 1954

2,690,677

UNITED STATES PATENT OFFICE 2,690,677

SHEAVE LUBRICATING SYSTEM

Eugene J. Otto, Milwaukee, Wis., assignor to Allis-Chalmers Manufacturing Company, Milwaukee, Wis.

Original application March 29, 1951, Serial No. 218,157. Divided and this application August 11, 1952, Serial No. 303,705

9 Claims. (Cl. 74—230.17)

This invention relates to the lubrication of mechanical elements and more particularly to the lubrication of limited areas of a cylindrical bearing surface having contact with segmental lugs rather than with full cylindrical bearing surfaces. This is a divisional application of my pending application, Serial No. 218,157, filed March 29, 1951.

Particularly in the art of expansible sheaves of the sliding cone type such as are used with edge driving belts of the trapezoidal or V-belt type and in friction gearing of various types, it has been found desirable to mount frusto-conical faced flanges on cylindrical power transmission elements through use of flange supporting lugs of arcuate form circumferentially spaced to interdigitate with similar lugs on other relatively movable flanges of similar construction. Such a sheave is illustrated, for example, in the applicant's U. S. Patent No. 2,610,516, filed May 14, 1949, for a Spring Loaded Variable Diameter Sheave and Drive. Owing to the fact that there is almost unavoidably a substantial clearance between such interdigitating segmental lugs, considerable leakage of lubricant from the sliding bearings has been experienced, and poor lubrication has resulted from ordinary lubrication methods previously employed.

The object of the present invention is to devise a novel improved bearing lubricating arrangement for sliding bearings between spaced arcuate lugs of limited area and a cylindrical element surface which will substantially eliminate leakage and yet be practical from a manufacturing and operating point of view.

The following is a full, clear and concise description of an embodiment of the invention devised by the inventor for carrying his object into practical effect. Reference is made to the accompanying drawing, in which.

Figure 1:
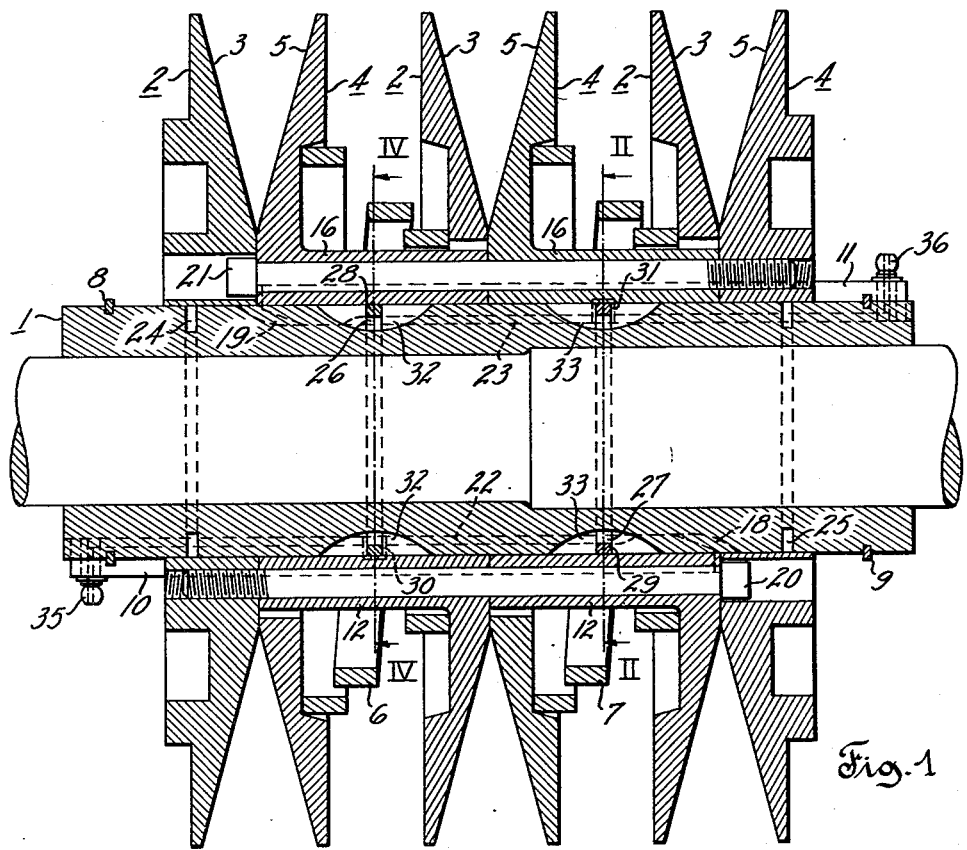
Fig. 1 is a longitudinal sectional view of one embodiment of a sheave embodying the invention.
Figure 2:
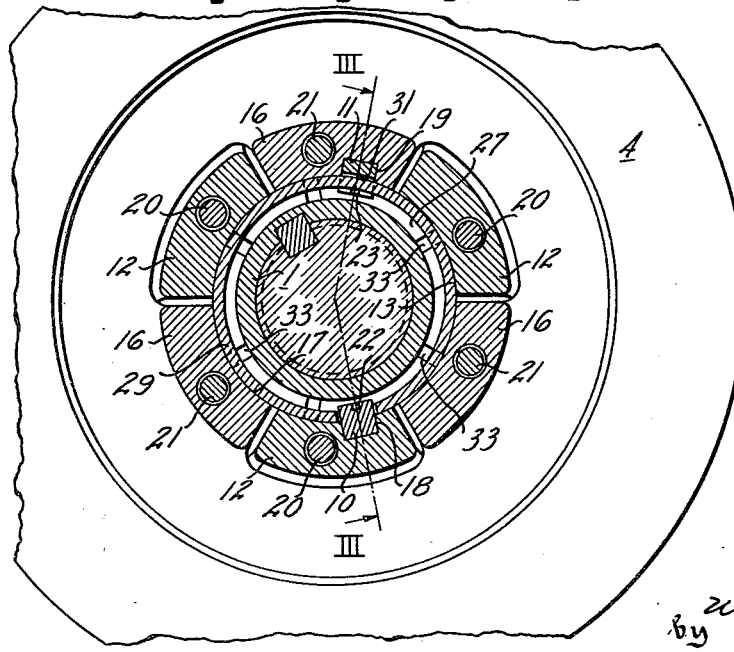
Fig. 2 is a fragmentary cross sectional view taken on line II—II of Fig. 1.
Figure 3:
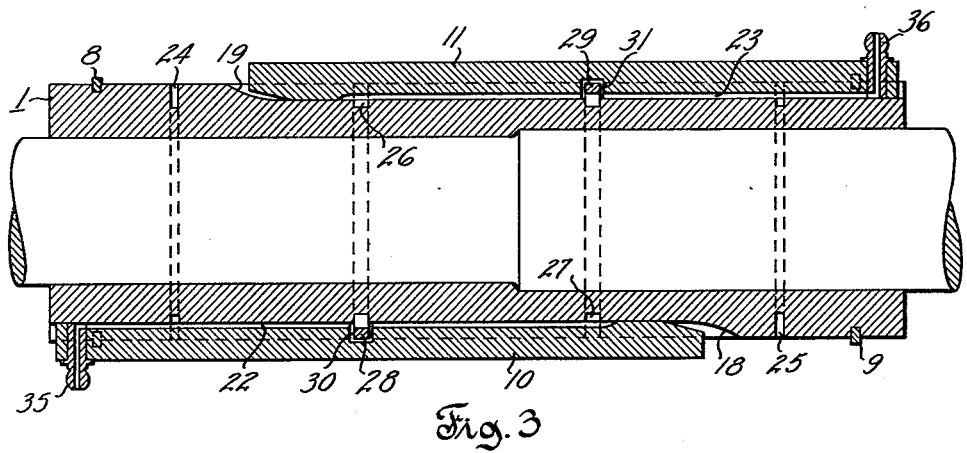
Fig. 3 is a fragmentary longitudinal sectional view taken on line III—III of Fig. 2.
Figure 4:
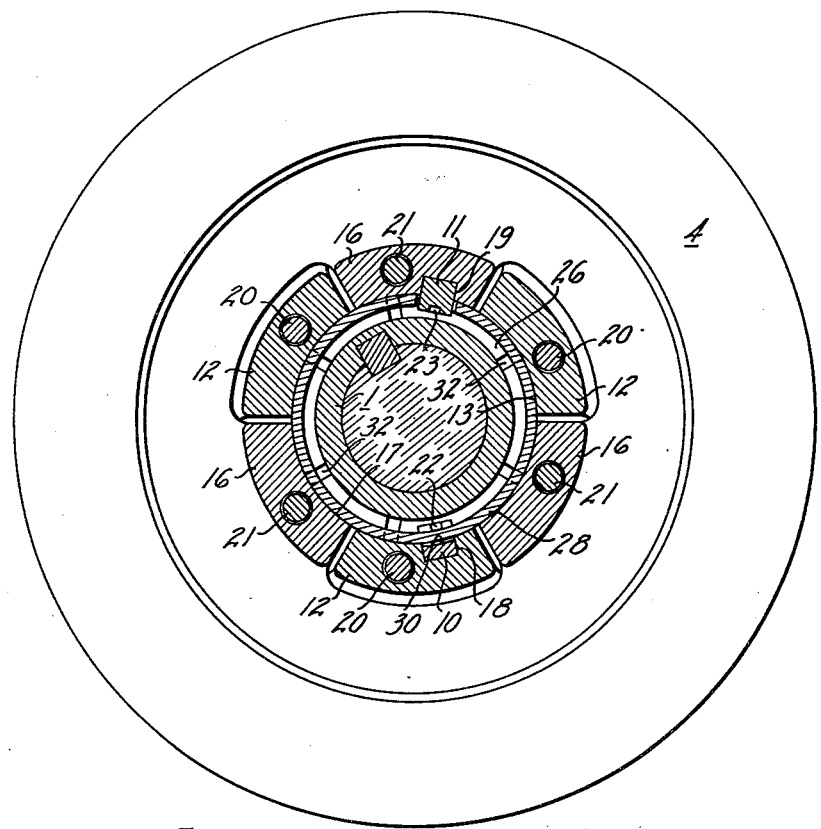
Fig. 4 is a cross sectional view taken on the line IV—IV of Fig. 1.

Still further objects and many specific advantages will be apparent from a reading of the following description.

The present invention is embodied in a "multiple grooved" variable pitch diameter or expansible sheave or pulley, as illustrated in the drawings, for use in a multiple speed V-belt drive. The principal features and operation of such sheave are fully illustrated and described in applicant's U. S. Patent No. 2,610,516, filed May 14, 1949, and will not be described in detail in this application. In the description of this invention, it will suffice to state that sleeve element 1 constitutes an externally cylindrical power transmission element which is arranged for mounting upon a rotary shaft. Upon this sleeve 1 are mounted a group of similarly facing sheave flanges 2 with frusto-conical faces 3 and a second group of similarly facing sheave flanges 4 with frusto-conical faces 5, the two groups facing oppositely, relative to each other. The two groups of flanges are relatively movable axially of the sleeve and are alternatively arranged to form cooperating pairs of oppositely facing flanges with opposed frusto-conical faces 3 and 5, the faces being movable toward and away from each other to expand and contract the effective pitch diameter of the pulley with reference to a given size of V-belt or other interposed frictional drive element (not shown). Suitable means such as springs 6 and 7 and snap rings 8 and 9 are provided to limit relative axial movement of the flanges on the sleeve; and keys 10 and 11, further described hereinafter, are provided to prevent relative rotation between the sleeve 1 and the flanges 2 and 4.

Certain of the flanges 2 are formed with arcuate bearing axially extending lugs 12 which are circumferentially spaced forming an annular series; and the inner arcuate surfaces 13 of these lugs fit the cylindrical external surface of sleeve element 1 in axially slidable relation. Each flange 2 having such lugs 12 is apertured between such lugs to a larger diameter than the diameter of the bearing surfaces 13 of the lugs.

Certain of flanges 4 are formed with lugs 16, similar to lugs 12 and have similar bearing surface 17, and each of these flanges 4 is apertured to a larger diameter between the lugs than the diameter of bearing surfaces 17, and in assembly each set of lugs is interdigitated and passes through the apertures between the other set of lugs. One lug 12 has a longitudinal keyway 18 cooperating with key 10 to prevent rotation relative to sleeve element 1; one lug 16 similarly has a longitudinal keyway 19 for receiving key 11. Suitable tie bolts 20 and 21 are passed through suitable holes in the flanges and lugs of their respective sets and serve to fix the relative axial position of each flange in a set relative to the others so that the two sets are movable as units relative to each other, axially of the sleeve element 1, the lugs serving as spacer struts between the individual flanges of a set.

The lugs 12 and 16 are so proportioned as to axial length and the snap rings 8 and 9 are so positioned axially of the sleeve 1 that the flanges and their lugs can only move axially through a distance substantially less than the lug length. Thus, certain points or circumferentially spaced areas on the external cylindrical surface of sleeve 1 will normally be covered by the inner arcuate bearing surfaces of the lugs.

In order to provide means to lubricate the bearings between the arcuate bearing surfaces 13 and 17 of the lugs so as to permit freedom for limited axial movement of the flanges, this invention makes use of the key seats 18 and 19 and keys 10 and 11 to provide practical longitudinal lubricant passages 22, 23 through which to move lubricant to the areas to be lubricated. Passages 22 and 23 are preferably formed by grooving the bottoms of the keys 10 and 11 as shown, but may if desired be formed by grooving the key seats 18 and 19, the object in either case being to form passages 22 and 23 so that they are in effect within the body of sleeve element 1 and have no outlet to the external cylindrical surface except in selected areas.

Lubricant can be fed to a full cylindrical bearing, such as that between an end disk 2 and end disk 4 which have no lugs, by providing circumferential grooves 24 and 25, normally sealed around the full circumference by the cylinder inner bearing surface of such end disks. However, if this were done in the axial vicinity of the bearings of lugs 12 and 16 on the sleeve, lubricant could escape freely between the lugs, where relatively large clearance is desirable.

The means by which lubricant is distributed to the lug bearing surface will be described hereinafter. Circumferential grooves 26 and 27 are formed in the external sleeve surface and communicate with or intersect the key seats 18 and 19 and lubricant passages 22 and 23. Grooves 26 and 27 are provided with rings 28 and 29, respectively, which fit the sides of the grooves closely and have a minimum outside diameter substantially equal to that of the external or bearing surface of sleeve element 1. Preferably such a ring will, like a piston ring, be split to provide a gap at one point large enough to permit passage of one of the keys 10 and 11, the other key being recessed to provide passage for the ring as shown at 30 and 31. Such rings 28 and 29 form outer walls for circumferential grooves 26 and 27, respectively.

To distribute lubricant to the lug bearing areas, auxiliary or branch lubricant pockets 32 and 33 communicating with the circumferential passages in grooves 26 and 27 are formed in sleeve 1 as by milling narrow longitudinal slots across the grooves at circumferentially spaced points or areas normally covered by the lugs. That is, at the centers of the normal lug bearing areas, points or circumferentially spaced areas normally covered by a lug bearing surface 13 or 17, openings or pockets are provided, as at 32 and 33, through the external cylindrical surface of sleeve 1 to provide for supply of lubricant from the circumferential passages formed by grooves 26 and 27, the passages being outwardly sealed at all other points by rings 28 and 29.

The rings 28 and 29 seal the passages within grooves 26 and 27, except at auxiliary passages or pockets 32 and 33, and thus prevent escape of lubricant between lugs 12 and 16.

Grease, oil or other lubricant supply fittings of known type are provided at 35 and 36, opening into the passages 22 and 23 defined by the formation of keys 10 and 11 and their key seats below the cylindrical external surface of the sleeve. The keys prevent escape of lubricant except at the desired areas where applicant has provided the distributing grooves and auxiliary passages described hereinabove. The lubricant forced in under pressure through either fitting 35 or fitting 36 will travel through all the above described passages to the points where lubrication is desired without waste or diversion through any unnecessary opening and will adequately lubricate all moving parts of the sheave without waste.

It will be understood that the details of the embodiment of the invention described hereinabove and illustrated in the drawings are by way of example only and that the lubricating system will be capable of beneficial use in mechanisms other than sheaves. It will also be understood that modifications of details and substitutions of substantial equivalents may be made without departing from the spirit and teaching hereof and that the invention is accordingly intended to include whatever lies within the legitimate scope of the appended claims.

It is claimed and desired to secure by Letters Patent:

1. In an expansible sheave of the axially movable cone type, the combination comprising: an annularly shaped, externally cylindrically surfaced power transmission element; a pair of frusto-conically faced flanges mounted on said element in axially movable relation, at least one of said flanges having an annular series of circumferentially spaced arcuate bearing lugs engaging said cylindrical surface of said element in axially slidable flange supporting relation; means for normally limiting relative axial and rotational movement of said lugged flange on said element in such a manner that a series of circumferentially spaced points of said cylindrical surface are normally covered by said lugs; a longitudinal lubricant passage in the body of said element; means for supplying lubricant to said passage; a circumferential lubricant passage enclosed in the body of said element and positioned in the axial vicinity of said points and communicating with said longitudinal passage; and a plurality of branch lubricant pockets communicating with said circumferential passage and opening outwardly through said cylindrical surface only at the circumferentially spaced points normally covered by said lugs.

2. The combination of claim 1 in which said means limiting movement of said lugged flange includes a key engaging a longitudinal keyway in one of said lugs and a suitable key seat in said element for preventing relative rotation of said flange and element; said key and key seat being so formed and assembled as to form therebetween said longitudinal lubricant passage in the body of said element.

3. The combination of claim 1 in which said element has a circumferential groove in the vicinity of said points and communicating with said longitudinal passage and a ring in said groove and forming a closure therefor at said cylindrical surface, said ring and groove being so formed and assembled as to form therebetween said circumferential lubricant passage in the body of said element.

4. The combination of claim 2 in which said element has a circumferential groove in the vicinity of said points and communicating with said longitudinal passage and a ring in said groove and forming a closure therefor at said cylindrical surface, said ring and groove being so formed and assembled as to form therebetween said circumferential lubricant passage in the body of said element.

5. In a lubricated sliding bearing between machine parts, the combination including: an annularly shaped, externally cylindrically surfaced rotary power transmission element; a member having an annular series of circumferentially spaced arcuate bearing lugs engaging said cylindrical surface of said element in axially slidable relation; means normally limiting relative movement of said member and element in such a manner that a series of circumferentially spaced points of said cylindrical surface are normally covered by said lugs; a longitudinal lubricant passage in the body of said element; means for supplying lubricant to said passage; a circumferential lubricant passage enclosed in the body of said element and positioned in the vicinity of said points and communicating with said longitudinal passage; and a plurality of branch lubricant pockets communicating with said circumferential passage and opening outwardly through said cylindrical surface only at circumferentially spaced points normally covered by said lugs.

6. The combination of claim 5 in which said means limiting relative movement includes a key engaging a longitudinal keyway in one of said lugs and a suitable key seat in said element for preventing relative rotation of said member and element; said key and key seat being so formed and assembled as to form therebetween said longitudinal lubricant passage in the body of said element.

7. The combination of claim 5 in which said element has a circumferential groove in the vicinity of said points and communicating with said longitudinal passage and a ring in said groove and forming a closure therefor at said cylindrical surface, said ring and said groove being so formed and assembled as to form therebetween said circumferential lubricant passage in the body of said element.

8. The combination of claim 6 in which said element has a circumferential groove in the vicinity of said points and communicating with said longitudinal passage and a ring in said groove and forming a closure therefor at said cylindrical surface, said ring and said groove being so formed and assembled as to form therebetween said circumferential lubricant passage in the body of said element.

9. A lubricated power transmission sleeve of cylindrical form having a longitudinal key seat in its external surface and a key secured in said seat, said key and seat being so formed and assembled relative to each other as to form therebetween a longitudinal passage for a lubricant; means for supplying lubricant to said passage; said sleeve having a circumferential groove in its external surface intersecting said passage, and a ring in said groove forming a closure therefor at the external surface of said sleeve, said ring and said groove being so formed and assembled relative to each other as to form a circumferential lubricant passage; said sleeve having a plurality of branch lubricant passages communicating with said circumferential passage and opening outwardly through said external surface only at circumferentially spaced points adjacent said ring and groove.

References Cited in the file of this patent

UNITED STATES PATENTS

| Number | Name | Date |
| --- | --- | --- |
| 2,107,483 | Knight | Feb. 8, 1938 |
| 2,524,575 | Shaw | Oct. 3, 1950 |